US006955745B1

(12) United States Patent
Shepherd et al.

(10) Patent No.: US 6,955,745 B1
(45) Date of Patent: Oct. 18, 2005

(54) METHOD OF SPARK-PROCESSING SILICON AND RESULTING MATERIALS

(75) Inventors: Nigel D. Shepherd, Gainesville, FL (US); Rolf E. Hummel, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/632,598

(22) Filed: Aug. 1, 2003

Related U.S. Application Data

(60) Provisional application No. 60/400,747, filed on Aug. 1, 2002.

(51) Int. Cl.$^7$ ................................................ H05F 3/00
(52) U.S. Cl. ..................................... 204/164; 427/535
(58) Field of Search .............................. 438/23, 29, 61, 438/69, 96, 466, 584; 257/13, 79, 103; 313/141, 313/169.3; 424/59, 65; 315/169.3; 423/348; 427/204, 580, 535, 540; 204/178, 192.23, 204/192.37, 164; 205/157; 164/134.2

(56) References Cited

U.S. PATENT DOCUMENTS

| | | | | |
|---|---|---|---|---|
| 4,226,897 A | * | 10/1980 | Coleman | 438/96 |
| 4,772,498 A | * | 9/1988 | Bertin et al. | 428/34.4 |
| 4,861,533 A | * | 8/1989 | Bertin et al. | 264/81 |
| 5,244,639 A | * | 9/1993 | Aratani et al. | 422/199 |
| 5,256,339 A | * | 10/1993 | Thornton et al. | 264/10 |
| 5,275,967 A | * | 1/1994 | Taniguchi et al. | 438/22 |
| 5,397,429 A | * | 3/1995 | Hummel et al. | 216/24 |
| 5,468,357 A | * | 11/1995 | Upadhya et al. | 204/173 |
| 5,510,633 A | * | 4/1996 | Orlowski et al. | 257/93 |
| 5,552,328 A | * | 9/1996 | Orlowski et al. | 438/23 |
| 5,597,621 A | * | 1/1997 | Hummel et al. | 427/554 |
| 5,720,917 A | * | 2/1998 | Matsuura et al. | 264/432 |
| 5,723,027 A | * | 3/1998 | Serole | 204/164 |
| 5,723,348 A | * | 3/1998 | Kumomi et al. | 438/22 |
| 5,733,662 A | * | 3/1998 | Bogachek | 427/446 |
| 5,756,924 A | * | 5/1998 | Early | 102/201 |

(Continued)

OTHER PUBLICATIONS

St. John, J.V. et. al., Formation of Europium Oxide structures on Crystalline Silicon by Spark Processing, Proceedings of the International Symposium on Advanced Luminescent Materials, Chicago, Oct. 8-13, 1985 Electrochem Soc p. 423-31, 1996.*

(Continued)

*Primary Examiner*—Richard Elms
*Assistant Examiner*—Michael K. Luhrs
(74) *Attorney, Agent, or Firm*—Saliwanchik, Lloyd & Saliwanchik

(57) ABSTRACT

The subject invention pertains to a method of spark processing silicon and resulting materials. The subject invention also relates to electroluminescent devices incorporating the materials produced by the subject method. The subject method for spark-processing can enhance the EL output, as compared with conventional spark-processed (sp) silicon. The enhancement of EL output can be due, at least in part, to increasing the light emitting area. The subject method can smooth the sp surface, so as to allow more complete coverage of the sp area with a continuous, semitransparent, conducting film. The smoothening of the sp surface can be accomplished by, for example, introducing into the spark plasma a volatile liquid, such as methanol, ethanol, acetone, in which particles can be suspended and/or in which a heavy ion salt is dissolved. The particles preferably float in the volatile liquid, rather than settle quickly. In a specific embodiment, silicon particles in the range of about 0.2 $\mu$m to about 20 $\mu$m in size can be suspended in the volatile liquid, such as methanol. The volatile liquid/silicon-particle suspension or volatile liquid/heavy ion salt solution, can then be inserted into a means for applying the mixture to the surface of a silicon wafer during spark-processing.

26 Claims, 8 Drawing Sheets

U.S. PATENT DOCUMENTS

| | | | |
|---|---|---|---|
| 5,811,030 A * | 9/1998 | Aoki .......................... 516/33 |
| 5,830,540 A * | 11/1998 | Bowers ...................... 427/562 |
| 6,083,355 A * | 7/2000 | Spence ....................... 204/164 |
| 6,113,746 A | 9/2000 | Hack et al. |
| 6,264,801 B1 | 7/2001 | Hack et al. |
| 6,280,799 B1 * | 8/2001 | Okabe et al. ............... 427/466 |
| 6,316,062 B1 * | 11/2001 | Sakaguchi et al. .......... 427/570 |
| 6,369,405 B1 * | 4/2002 | Canham et al. ............... 257/17 |
| 6,468,602 B2 * | 10/2002 | Sakaguchi et al. .......... 427/570 |
| 6,469,605 B2 | 10/2002 | Hack et al. |
| 6,512,562 B1 * | 1/2003 | Kobayashi et al. ......... 349/122 |
| 6,613,276 B1 * | 9/2003 | Munir et al. ................ 420/580 |
| 6,630,356 B1 * | 10/2003 | Armstrong et al. ......... 436/172 |
| 6,683,367 B1 * | 1/2004 | Stalmans et al. ........... 257/618 |
| 6,780,219 B2 * | 8/2004 | Singh et al. ................... 75/342 |
| 6,780,649 B2 * | 8/2004 | Armstrong et al. ......... 436/172 |
| 2001/0018938 A1 * | 9/2001 | Arai et al. ................... 148/301 |
| 2002/0064606 A1 * | 5/2002 | Sakaguchi et al. .......... 427/569 |
| 2003/0151707 A1 * | 8/2003 | Kobayashi et al. ........... 349/96 |
| 2004/0149353 A1 * | 8/2004 | Hill ............................. 148/33 |

OTHER PUBLICATIONS

"Above-band-gap photoluminescence from Si fine particles with oxide shell," H. Morisak et al, J. Appl. Phys., 70, pp. 1869-1870, (1991).*

R.E. Hummel and S.-S. Chang (1992) Appl. Phys. Lett. 61:1965-7.*

Silicon Based Materials and Devices, edited by Nalwa, Hari Singh, Academic Press, vol. 1, (chapter 6 by R.E. Hummel) pp. 238-266.*

Shepherd, N., et al. "Improved Electroluminescence of Spark-Processed Silicon by an Aerosol-Assisted Technique" *Phys. Stat. Sol.*, May 9, 2003, pp 222-227, vol. 197, No. 1, Wiley-VCH, Weinheim.

Stora, M.E. et al. "Variation of Spark-Processing Parameters on the Photoluminescence Properties of Spark-Processed Silicon" *Journal of Physics and Chemistry of Solids*, Sep. 2002, pp. 1655-1668, vol. 63, Elsevier Science Ltd.

Yuan, J. et al. "Electroluminescence from Spark-Processed Silicon" *Applied Phys. Lett.*, Nov. 27, 1995., pp. 3328-3330, vol. 67, Is. 22, American Institute of Physics.

Yuan, J. et al. "Electroluminescence and Nature of Lightly Spark- Processed Silicon" *Semiconductor Science Technology*, Jun. 1998, vol. 13, No. 6, pp 615-621, IOP Publishing Ltd., UK.

* cited by examiner

← 3 mm →

|←——— 7 mm ———→|

METHOD OF SPARK-PROCESSING SILICON AND RESULTING MATERIALS

CROSS-REFERENCE TO RELATED APPLICATION

This application claims the benefit of U.S. Provisional Application Ser. No. 60/400,747, filed Aug. 1, 2002.

The subject invention was made with government support under a research project supported by National Science Foundation Funding Grant No. 9706993.

BACKGROUND

The emphasis of exploring and understanding the physical properties of spark-processed silicon (sp-Si) has been directed in the past mainly towards its strong, room temperature, photoluminescence (PL) in the blue and green spectral range (R. E. Hummel, in *Silicon-Based Materials and Devices*, Vol. 1, Materials Processing, edited by H. S. Nalwa (Academic Press, New York, 2001) pp. 237–266, and R. E. Hummel and S.-S. Chang (1992) *Appl. Phys. Lett.* 61:1965). The usefulness of sp-Si is widely recognized because of the stability of this material towards high-temperature annealing (at least up to 1000° C.), environmental interactions, laser radiation, and HF etching (R. E. Hummel, in *Silicon-Based Materials and Devices*, Vol. 1, Materials Processing, edited by H. S. Nalwa (Academic Press, New York, 2001) pp. 237–266 and R. E. Hummel and S.-S. Chang (1992) *Appl. Phys. Lett.* 61:1965). Further, the PL of sp-Si is fast, having decay times in the nanosecond range.

The electroluminescence (EL) properties of sp-Si have also been explored, with however, limited success (J. Yuan and D. Haneman (1995) *Appli. Phys. Lett.* 67:3328). Specifically, the EL light emission of sp-Si was found to be considerably smaller than that observed for the PL mode.

Conventional spark-processing is performed by applying high frequency, high voltage, low average current electrical pulses for a certain length of time between a substrate and a counter electrode. As an example, pulses can be applied for several seconds between 2 Ω cm, 400 $\mu$m thick <100> Si wafer and a counter electrode. The sparks can be applied through the native $SiO_2$ layer while the non-sparked areas remain covered by $SiO_2$. A tungsten tip (anode) has been found to be an efficient counter electrode and can be placed about 0.5 mm above the substrate (cathode) (M. E. Stora and R. E. Hummel (2002) *J. Phys. Chem. Sol.* 63:1658). Unipolar pulses involving, for example, a frequency of 16 kHz, currents between 5 to 10 mA and air as a sparking medium are typical (M. E. Stora and R. E. Hummel (2002) *J. Phys. Chem. Sol.* 63:1658). The typical resulting product is a grayish looking layer on (and in) the Si substrate which, in plan view, is surrounded by a light brown halo.

A complete EL device can have a sp-Si layer on a Si substrate, an ohmic aluminum contact on the back side of the wafer, and a thin (15–17 nm thick) semitransparent silver (Ag) film which covers the front (spark-processed) surface, as shown in FIG. 1. The transparency of a smooth Ag film of the aforementioned thickness for 700 nm light is about 30%. However, the actual film thickness over the spark-processed area can vary considerably due to its rough and pitted nature so that different transmissivities should be expected across the spark-processed surface. Moreover, 80% of the sp-surface is probably not continuously covered by the conductive film so that approximately only 20% of the sp surface participates in the EL emission. This is illustrated in FIG. 2 which depicts the EL emission of conventionally spark-processed Si under 30-fold magnification when a driving voltage of 7V is applied to the device. Specifically, to the naked eye, the EL emission can appear to be a continuous circular band of yellowish-red light which emanates only from the halo region. Moreover, under an optical microscope it is observed that the band consists of small, individual, light-emitting spots, which are separated from each other (on the order of tens of microns) by non-emitting areas. Some of these spots emit orange, others green, and still others, blue light. They appear randomly distributed over the emitting surface.

The subject invention relates to a method for spark processing which increases the EL emission of sp-Si by at least one order of magnitude compared to the intensities which are achieved when conventional spark-processing techniques are applied.

BRIEF DESCRIPTION OF THE INVENTION

The subject invention relates to an improved technique for spark-processing Si and the resulting materials. The subject invention also relates to electroluminescent devices incorporating the materials produced by the subject method. The subject technique can enhance the electroluminescent light emission of the resulting spark-processed Si, as compared with conventional spark-processing of Si. The subject invention involves applying, to silicon 14, sparks of sufficiently high voltage 15 to effect the production of spark-processed silicon and introducing into the spark plasma 11, created by the application of sparks to the silicon, a volatile liquid 12 in which particles 18 are suspended and/or a heavy ion salt is dissolved. Examples of the particles which can be suspended in volatile liquids, such as methanol, ethanol, and acetone, include but are not limited to: Si, $SiO_2$, and/or $Si_3N_4$ particles. In order to be in suspension for a sufficient amount of time, preferably the particles range in size from about 0.2 $\mu$m to about 20 $\mu$m.

A variety of means can be utilized for introducing the volatile liquid suspension and/or salt solution into the spark plasma created by the application of sparks to the silicon. Preferably, the means for introducing the volatile liquid causes an aerosol of the volatile liquid suspension and/or salt solution to be introduced into the spark plasma. The introduction of such an aerosol into the spark plasma can reduce the spark energy and flash evaporation of the silicon, such as a silicon substrate, which is being processed. The introduction of the aerosol can also increase the area of the processed region. In a specific embodiment, the aerosol is introduced so as to spread out over an area having a diameter of about 8 millimeters. As the spark follows the path of least resistance, a corresponding area (approximately 50 $mm^2$) of the silicon can be spark processed.

DETAILED DESCRIPTION OF SUBJECT INVENTION

The subject invention pertains to a method of spark processing silicon and resulting materials. The subject invention also relates to electroluminescent devices incorporating the materials produced by the subject method. The subject method for spark-processing can enhance the EL output, as compared with conventional spark-processed (sp) silicon. The enhancement of EL output can be due, at least in part, to increasing the light emitting area. The subject method can smooth the sp surface, so as to allow more complete coverage of the sp area with a semitransparent, conducting film 4. Such a semitransparent, conducting film can be formed from materials such as, but not limited to, Ag, Au, and Al, as well as other suitable organic, or nonorganic, transparent and conducting film material, such as a conducting organic polymer. Preferably the transparent film is completely transparent, but can be partially transparent.

The smoothening of the sp surface can be accomplished by, for example, introducing into the spark plasma 11 a volatile liquid 12, such as methanol, ethanol, and/or acetone, in which particles 18 can be suspended and/or a salt can be dissolved. The particles preferably float in the volatile liquid 12, rather than settle quickly. In a specific embodiment, silicon particles in the range of about 0.2 $\mu$m to about 20 $\mu$m in size can be suspended in the volatile liquid, such as methanol. In another specific embodiment, $SiO_2$ and/or $Si_3N_4$ particles can be suspended in a volatile liquid, with particles in the range of about 0.2 $\mu$m to about 20 $\mu$m being preferred. The volatile liquid/silicon-particle suspension, such as a methanol/silicon-particle suspension, can first be intimately mixed before introduction into the spark plasma. In a specific example, the suspension can be stirred for about twenty minutes.

In another specific embodiment, a salt of a heavy ion can be dissolved in a volatile liquid, such as methanol, ethanol, and/or acetone. Examples of salts which can be utilized for this purpose include, but are not limited to the following: transition metal salts, such as manganese chloride; rare-earth salts; and lanthanide ion salts, such as cerium chloride, terbium chloride, and europium chloride. The suspension or salt solution can then be inserted into a means for applying the suspension and/or salt solution to the surface of a silicon wafer 14 during spark-processing.

The sparks can be generated, for example, between a grounded Si wafer 14 and any standard electrode tip, such as a tungsten tip. In a specific embodiment, during spark processing, an anode tip can be separated from a cathode substrate and a high voltage can be applied, causing a spark to be generated between the anode tip and the cathode material. The anode tip can be electrically isolated from the means for introducing the volatile liquid suspension and/or salt solution into the spark plasma, or the anode tip can be in electrical contact with the means for introducing the volatile liquid suspension and/or salt solution. Preferably, the means for introducing the volatile liquid suspension and/or salt solution can also function as an anode. In a specific embodiment, a small-gauge hypodermic syringe, whose metal needle (stainless steel) can serve as an anode, can be used to apply the mixture to the surface of the wafer. A high frequency pulsed voltage 15 can be applied to the needle 13, as shown in FIG. 3. Spark processing can then be conducted by simultaneously applying moderate pressure 16 to the syringe piston while allowing the sparks to develop between anode and cathode.

Referring to FIG. 8, the tip of a metal needle 13 is depicted before 17 (left) and after 19 (right) modification of the tip. Such modification of the tip can enhance the characteristics of the volatile liquid suspension and/or salt solution exiting the tip. The tip in FIG. 8 has been filed so as to flatten the tip and cause pieces of the metal tip 20 to extend into the exit aperture. The pieces extending into the exit aperture can restrict the flow of the volatile liquid exiting the tip. Such restriction of the flow can assist in the production of an aerosol pattern exiting the tip. In a specific embodiment, the needle can also be bent to further restrict the flow through the needle. The needle shown in FIG. 8 has a diameter of 0.1 mm. Other size needles can also be utilized.

Typically, applied voltages range from about 1,000 to about 30,000 volts. Preferably, the applied voltage is between about 5,000 and about 20,000 volts, and most preferably between about 10,000 and about 15,000 volts. The amperage of the current can range from about 0.1 milliampere to about 1 amp. Preferably, the amperage will be between about 1 milliampere and about 5 milliamperes, and most preferably between about 1 milliampere and about 3 milliamperes. The frequency of the sparks can range from about 1,000 to about 30,000 hertz. Preferably the frequency is between about 5,000 and about 20,000 hertz, and most preferably between about 10,000 and about 15,000 hertz. One skilled in the art, having the benefit of the subject disclosure, would readily understand the variety of parameters of the spark processing process that can be varied, for example as described in the following references: U.S. Pat. No. 6,113,746 (Hack et al.); M. E. Stora and R. E. Hummel (2002) *J. Phys. Chem. Sol.* 63:1655; N. Shepherd and R. E. Hummel (2003) *J. Phys. Chem. Sol.* 64:967; and N. Shepherd and R. E. Hummel (2003) *Phys. Stat. Sol.* (a) 197(1): 222, which are herein incorporated by reference in their entirety.

The materials resulting from the subject spark process can be a whitish-gray area, for example, about 7–8 mm in diameter, whose light emission appears much more uniform under the microscope and which does not seem to display a separate halo region as compared with conventional sp-Si. FIG. 4 shows a photograph of the light emission from a sample of spark-processed silicon produced in accordance with a specific embodiment of the subject invention, under 30-fold magnification when driven by a 7V driving voltage. The tip of the electrode can be positioned such that a spark plasma forms. In a specific embodiment, the tip of the electrode is between about 0.5 mm and about 10 mm from the surface of the silicon substrate. In a further specific embodiment, high light output can be achieved when the spark gap is set between 3 and 4 mm in order to afford some space for an aerosol to develop upon introduction of the volatile liquid in the spark plasma.

Figure 5B:
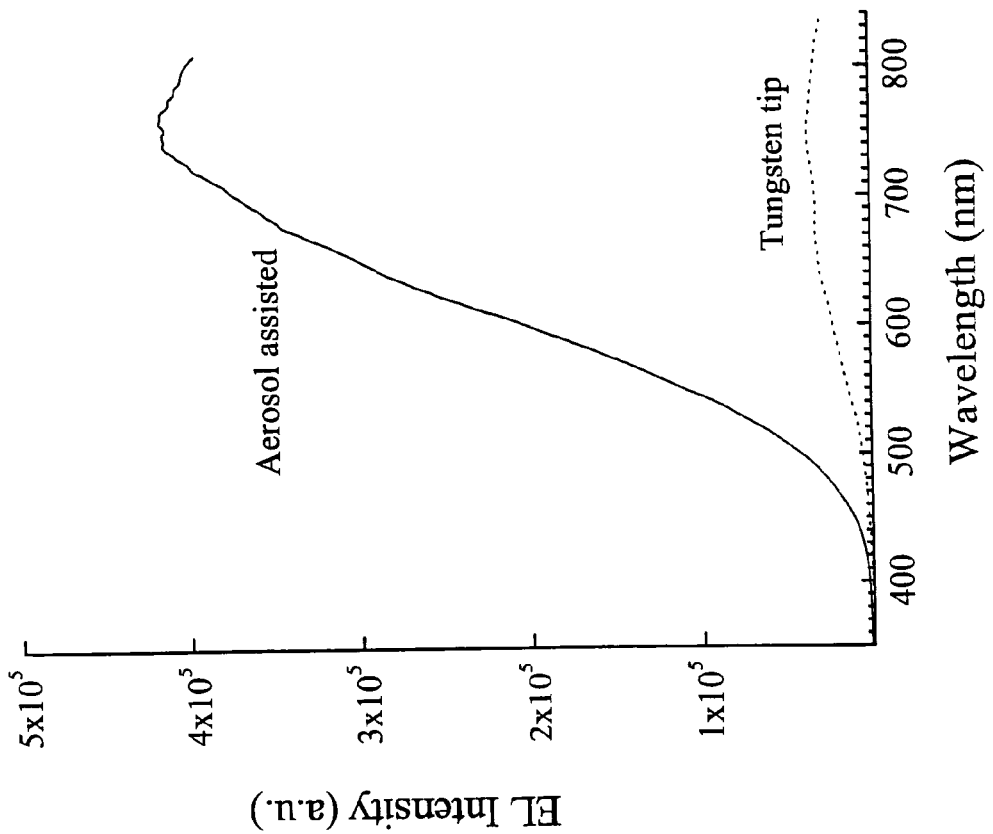
FIGS. 5(*a*) and 5(*b*) illustrate typical EL spectra of conventional sp-Si (using a tungsten tip) and aerosol-assisted sp-Si in accordance with the subject invention, respectively, using identical spectrometer and device settings, including a 6V driving voltage.
Figure 5A:
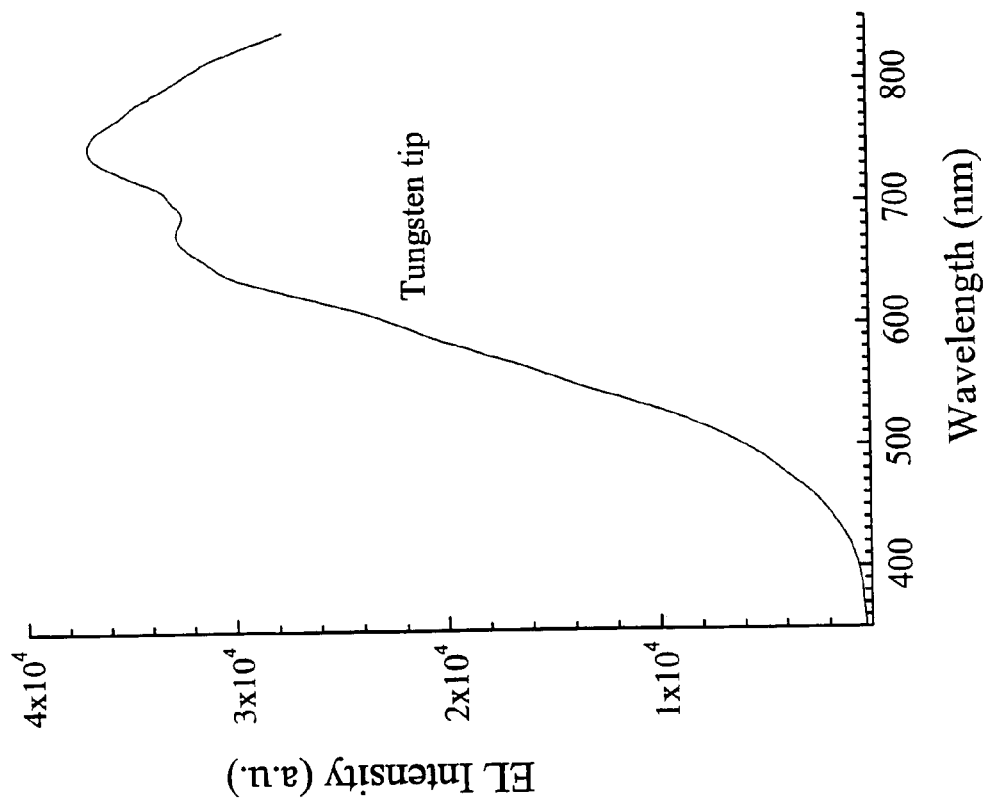

FIGS. 5(a) and 5(b) depict typical EL spectra of conventional sp-Si (using a tungsten tip) and aerosol assisted sp-Si in accordance with the subject invention, respectively, using identical spectrometer and device settings, including a 6V driving voltage. An increase in EL intensity for aerosol-assisted sp-Si compared to conventional sp-Si by one order of magnitude is observed, particularly in the red spectral range. The overall shapes of the two spectra are similar, displaying maxima near 730 nm (1.7 eV) and 660 nm (1.9 eV) and a threshold wavelength for light emission at about 360 nm (3.2 eV). However, the latter "structure" can only be observed as a slight shoulder in the aerosol-assisted sp-Si spectrum. The emitted light can be easily observed with the naked eye in a dimly illuminated environment. Other investigators (J. Yuan and D. Haneman (1995) *Appli. Phys. Lett.* 67:3328) using conventional sp-Si found EL spectra which appear to peak near 950 nm (1.31 eV), 775 nm (1.6 eV), and 650 nm (1.9 eV) when utilizing a few selected optical filters instead of a continuous spectrometer. In a later paper, the same investigators (J. Yuan, D. Haneman, I. Andrienko, R. Siegele, and P. Evans (1998) *Semicond. Sci. Technol.* 13:615) moved the 950 nm peak to 1150 nm (1.1 eV).

Figure 6:
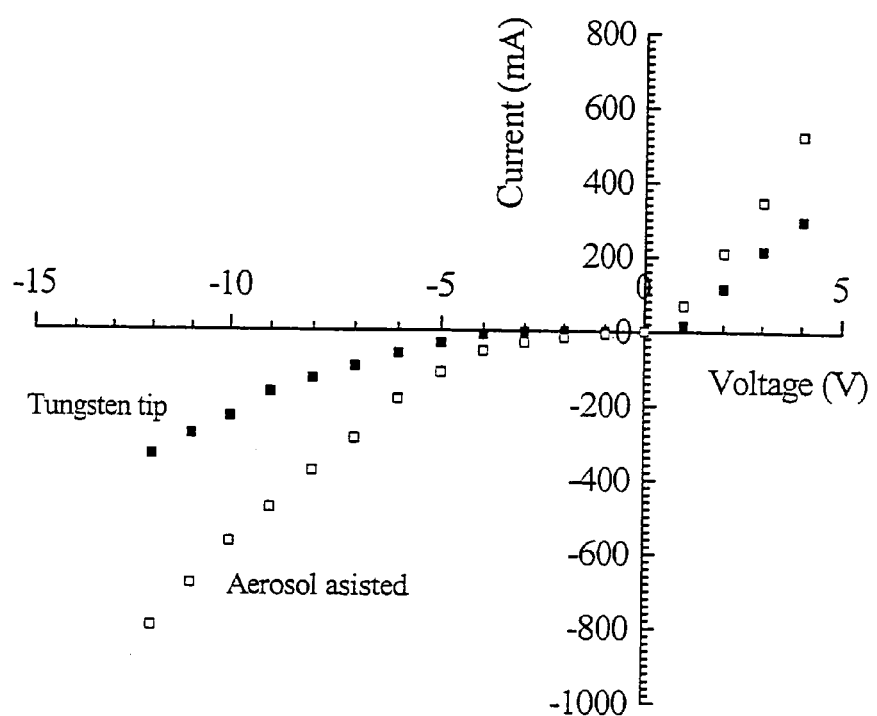
FIG. 6 compares the current-voltage behavior of a conventional sp-Si EL device prepared using a tungsten tip and an EL device prepared using the subject aerosol-assisted sp-processing technique.

FIG. 6 compares the current-voltage behavior of a conventional sp-Si EL device prepared using a tungsten tip and an EL device prepared using aerosol-assisted sp-Si in accordance with the subject invention. Both curves reveal features, which resemble rectifying characteristics. However, the device currents with respect to the device prepared using the aerosol-assisted spark processing in accordance with the subject invention are observed to be larger than for conventionally prepared sp-Si. This is interpreted to be mainly due to the improved surface coverage of the semitransparent Ag film, which results in a larger area participating in carrier injection into sp-Si. In addition, neither curve appears to display the typical features generally attributed to Shottky-barrier contacts. Specifically, the currents for "reverse bias" are substantially larger than those observed for a common rectifier diode. Moreover, the same light emission and other device characteristics are observed when n-type as well as p-type Si is utilized as substrate wafers. Further, in both cases light emission occurs only when the Ag film is negatively biased. The electron mobility in Si is known to be about three times larger than that of the hole mobility. Thus, it appears the recombination of electrons and holes may occur predominately on the interface between sp-Si and Si substrate. Light emission generally commences at a threshold voltage near −4V and increases in intensity, within limits, for higher negative voltages until a breakdown eventually occurs above about −12V. It appears that the EL mechanism for devices produced in accordance with the subject invention is essentially the same as the EL mechanism for EL devices produced by the conventional sp-Si technique.

Figure 7A:
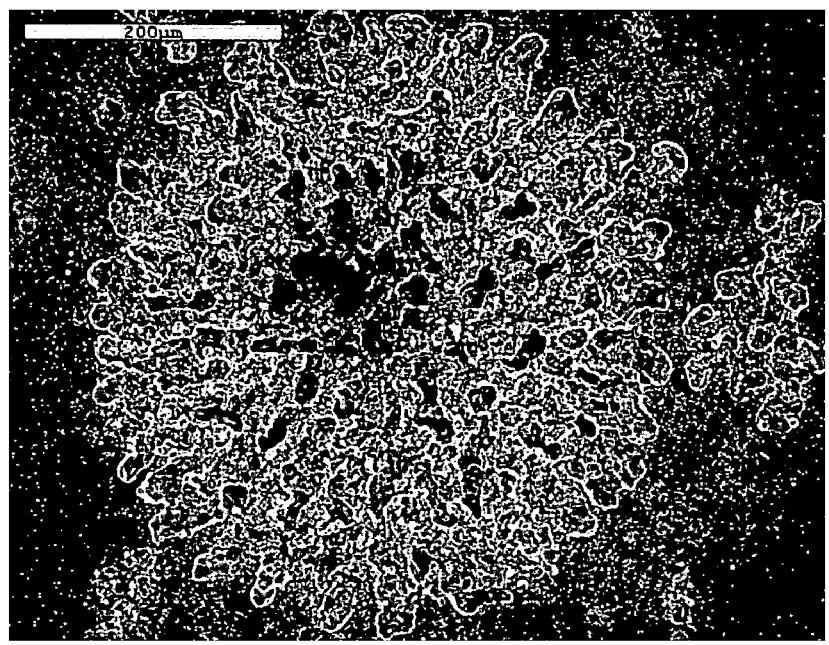
FIGS. 7(*a*), 7(*b*), and 7(*c*) show scanning electron microscopy surface morphology images of conventional sp-Si, conventional sp-Si under higher magnification, and aerosol-assisted sp-Si in accordance with the subject invention, respectively.
Figure 7B:
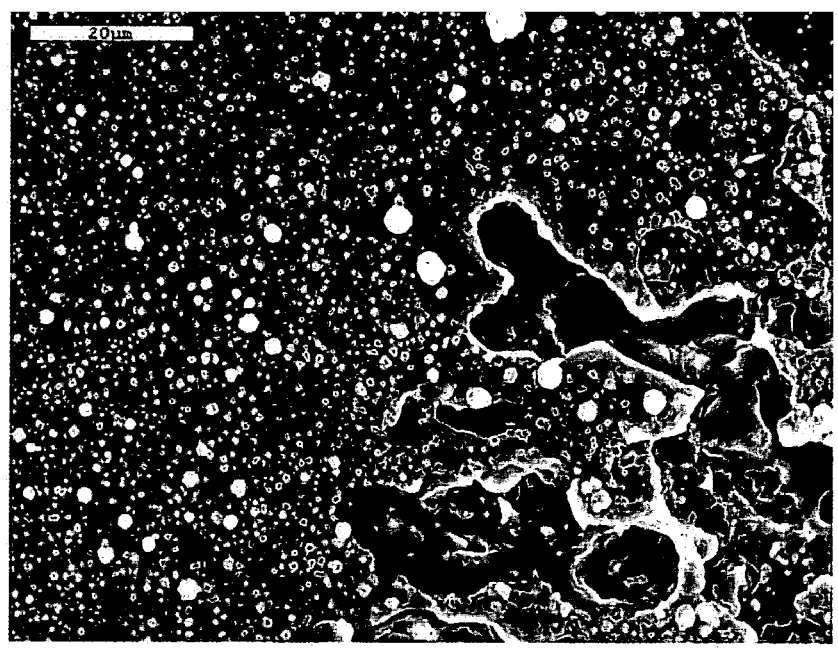
Figure 7C:
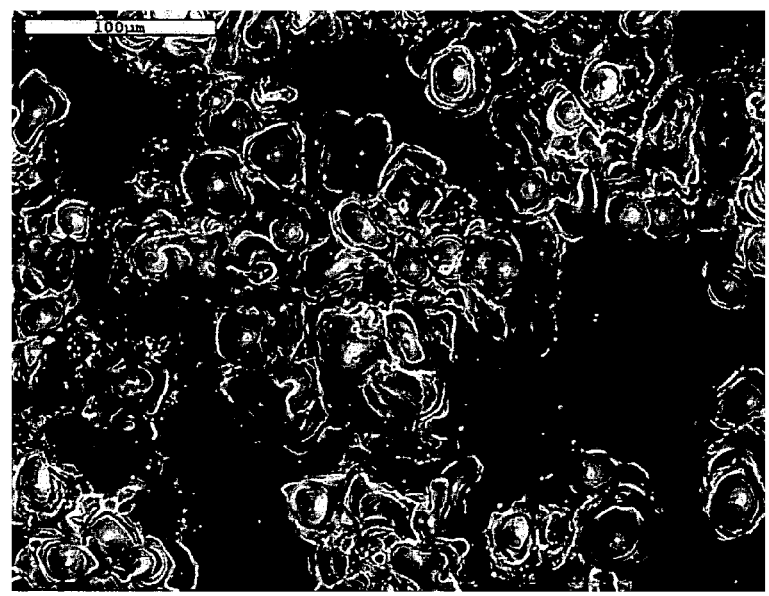
Figure 8:
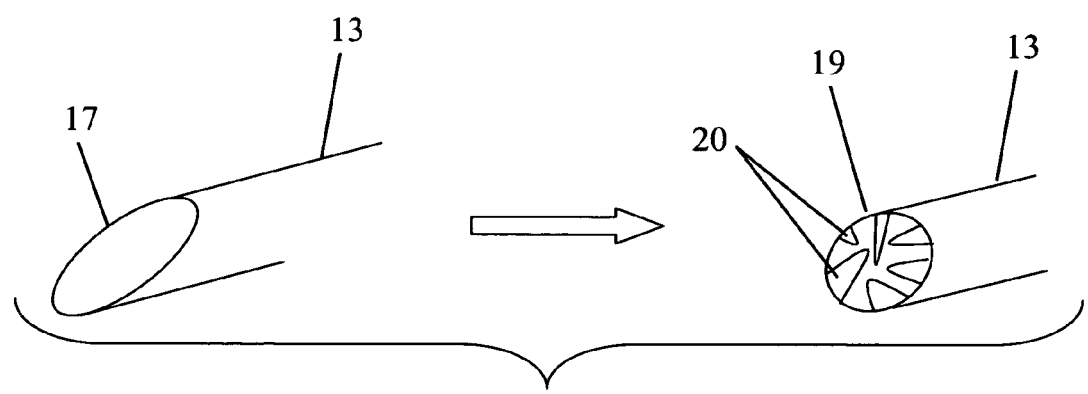
FIG. 8 shows a syringe tip which can be used to introduce a volatile liquid suspension and/or salt solution to the spark plasma in accordance with the subject invention, before and after filing the syringe tip in order to restrict the flow through the syringe and thus enhance the production of an aerosol exiting the syringe.

The surface morphologies of conventional sp-Si and aerosol-assisted sp-Si show marked differences. As mentioned above, the light emitting band for conventional sp-Si is generally restricted to the halo region which contains globules and agglomerates of various sizes ranging from about 1 to 3 $\mu$m in size. The center region has deep holes and valleys as has been shown in previous publications (R. E. Hummel, in *Silicon-Based Materials and Devices*, Vol. 1, Materials Processing, edited by H. S. Nalwa (Academic Press, New York, 2001) pp. 237–266, and R. E. Hummel and S.-S. Chang (1992) *Appl. Phys. Lett.* 61:1965) and in FIGS. 7(a) and (b). In contrast, aerosol-assisted sp-Si can display distinct cone-shaped structures, which are distributed essentially over the entire spark-processed area. These features can still occasionally be separated by unprocessed regions of the silicon surface as depicted in FIG. 7(c). It is possible that during aerosol-assisted spark processing a significant portion of the spark energy is diverted towards evaporating the methanol and accelerating some of the Si particles contained in the aerosol so that less energy is available for flash evaporation of the Si substrate. Additionally, the micrometer sized Si particles in the aerosol may impact with high energy onto the Si substrate during spark processing. In any event, the surface structure of the aerosol-assisted spark-processed Si appears smoother than that of conventional sp-Si and, may therefore be more continuously covered by the semitransparent Ag film.

Figure 1:
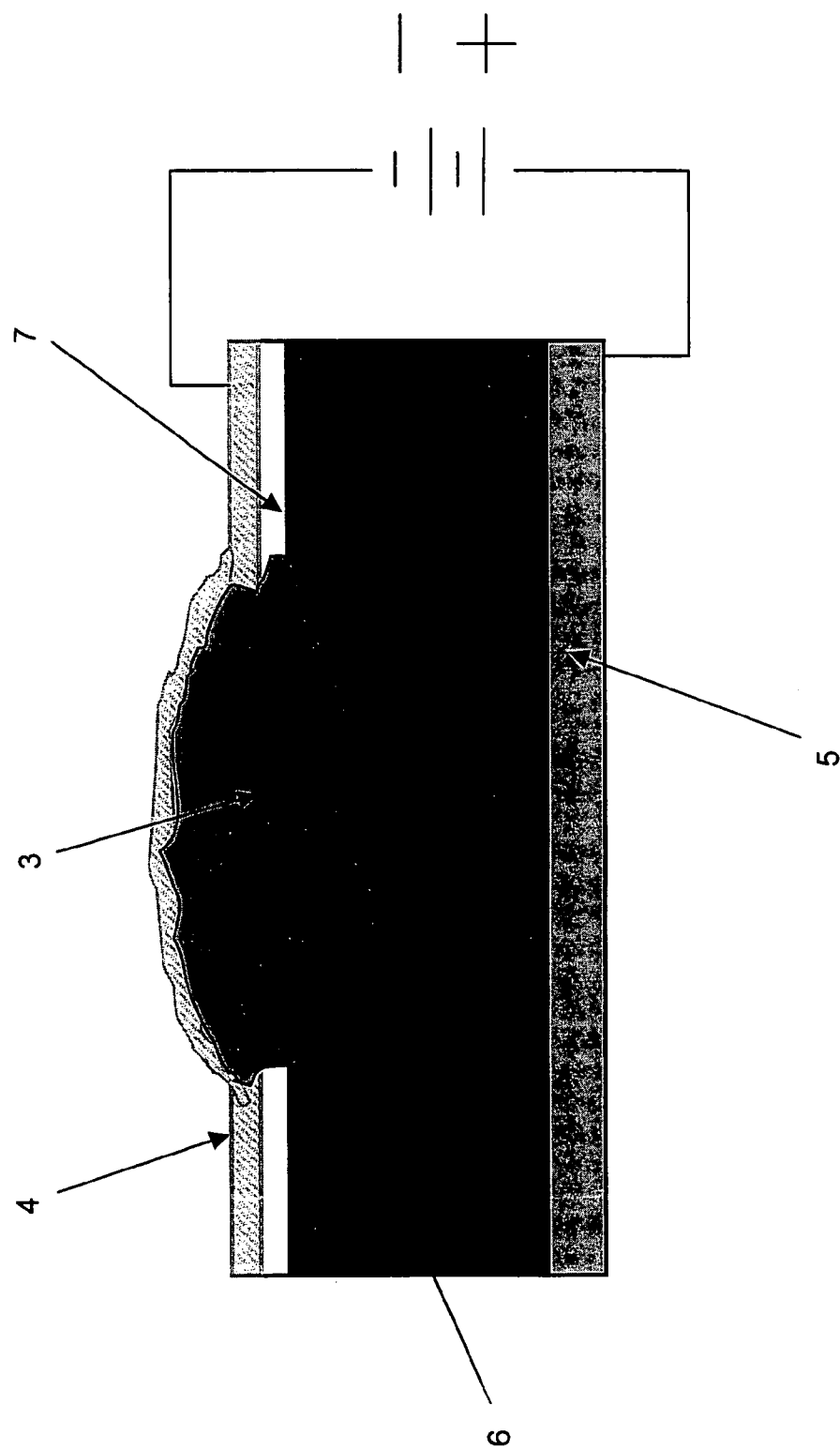
FIG. 1 illustrates an EL device comprising an ohmic aluminum contact on the back side of the wafer and a semitransparent silver (Ag) film which covers the front (spark-processed) surface.
Figure 2:
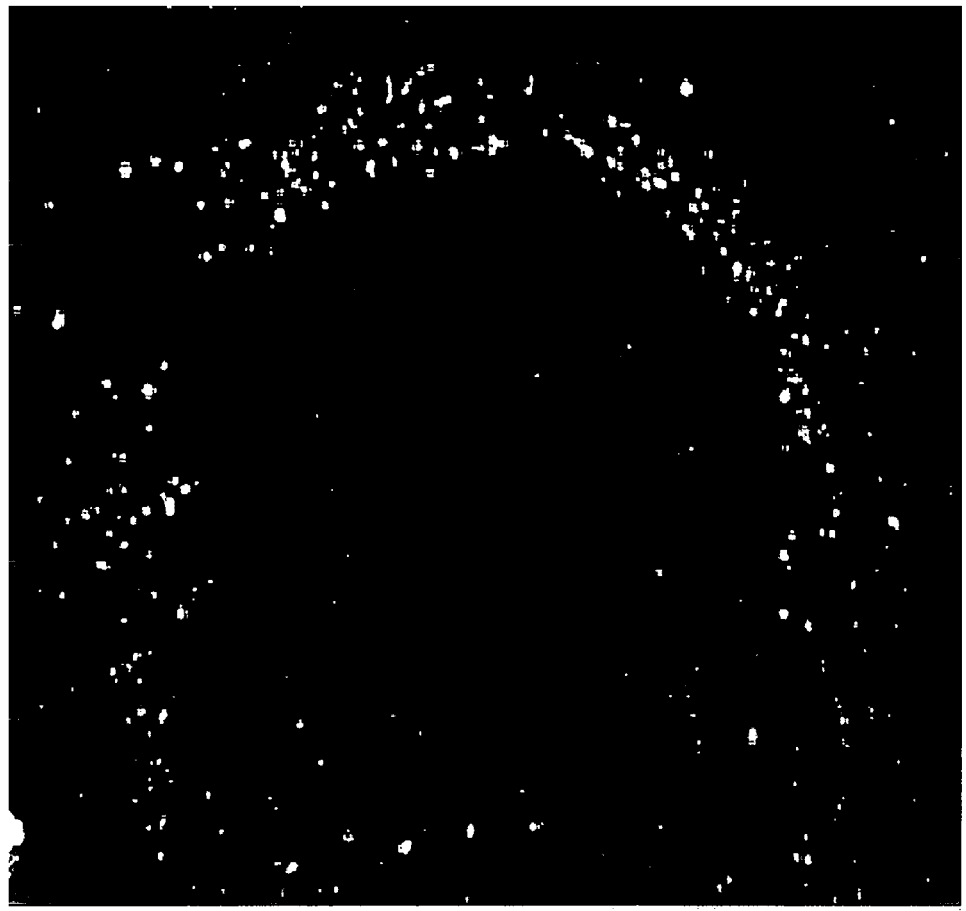
FIG. 2 illustrates the EL emission of conventionally spark-processed Si under 30-fold magnification when driven by a 7V driving voltage.
Figure 3:
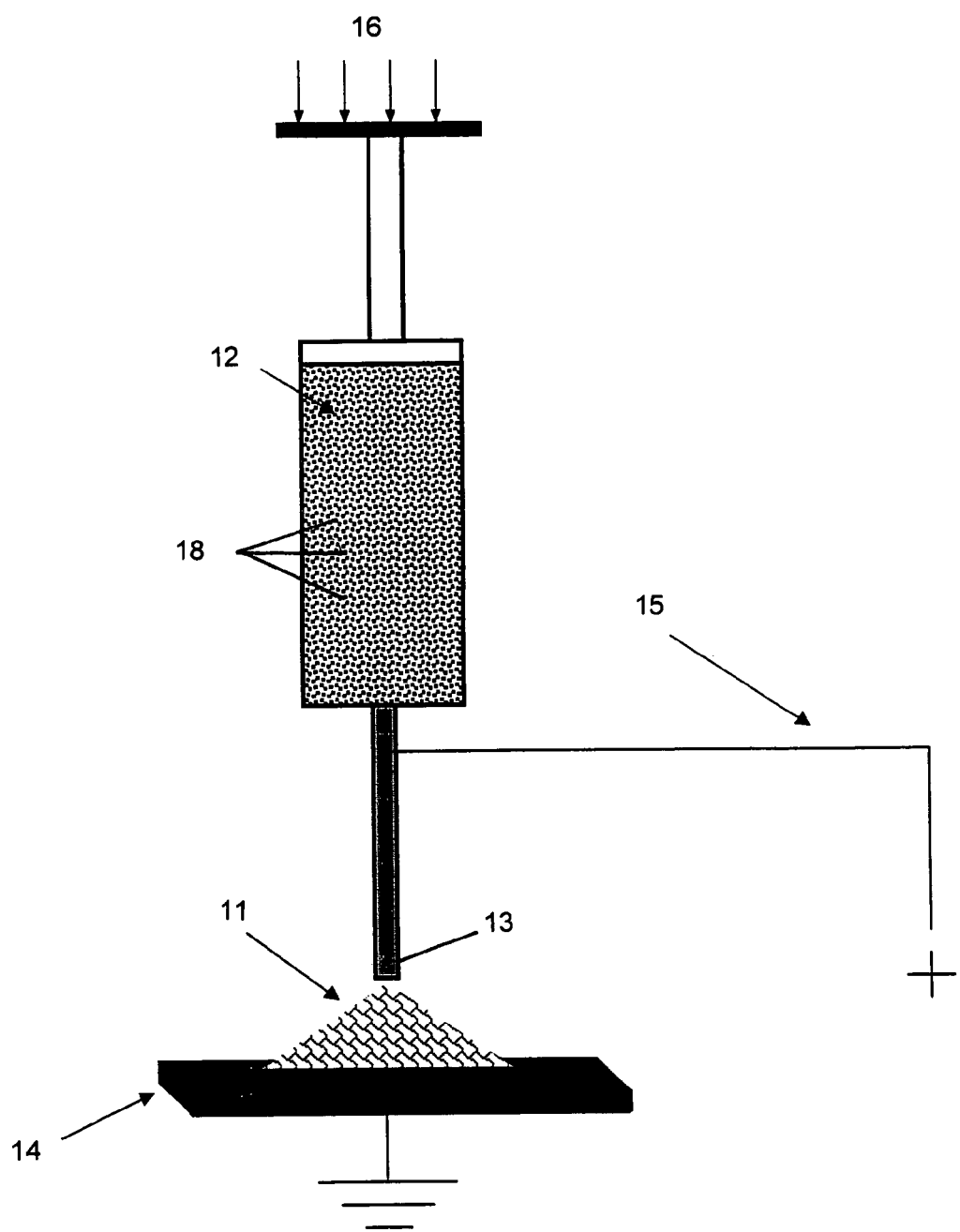
FIG. 3 illustrates the application of a methanol/silicon particle suspension to facilitate aerosol-assisted sp-Si using, for example, a hypodermic needle to which a voltage is applied, in accordance with a specific embodiment of the subject invention.
Figure 4:
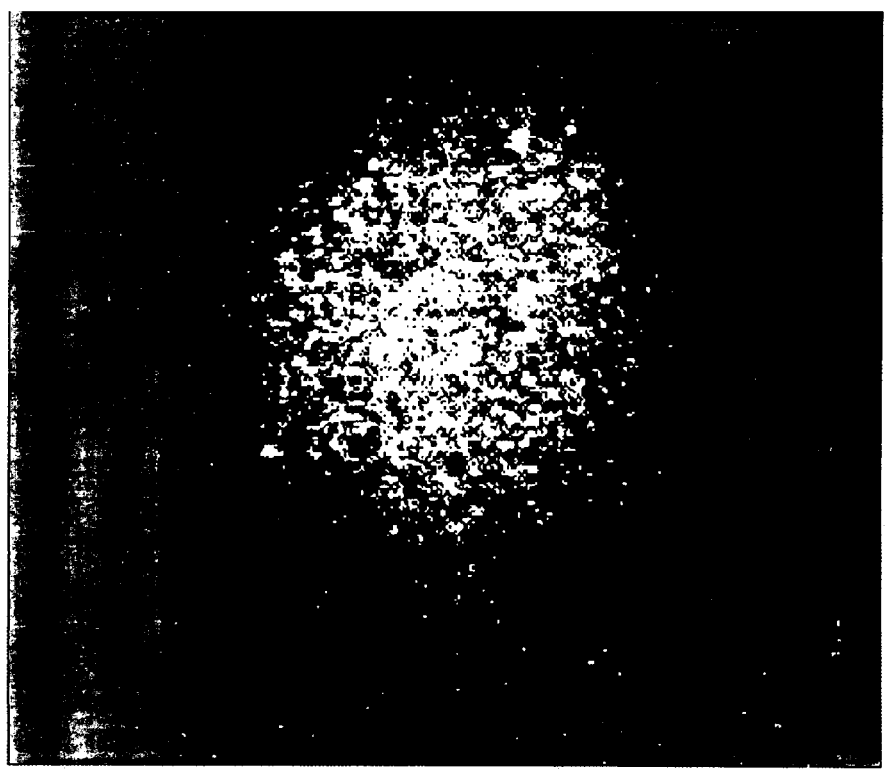
FIG. 4 illustrates the EL emission of spark-processed Si produced in accordance with a specific embodiment of the subject invention, under 30-fold magnification when driven by a 7V driving voltage.

A control experiment conducted when the same processing steps as shown in FIG. 1 are performed, omitting, however, the spark-processing, resulted in no light emission and no observed device current. In this case, the protective $SiO_2$ layer between Si and Ag prevents carrier injection.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for spark-processing silicon, comprising:
   applying to silicon sparks of sufficiently high voltage to effect the production of spark-processed silicon, wherein applying to the silicon sparks of sufficiently high voltage to effect the production of spark-processed silicon creates a spark plasma; and
   introducing into the spark plasma a volatile liquid in which particles are suspended.

2. The method according to claim 1,
   wherein introducing into the spark plasma a volatile liquid in which particles are suspended during the production of the spark-processed silicon enhances the electroluminescence of the spark-processed silicon.

3. The method according to claim 1,
   wherein Si particles are suspended in the volatile liquid.

4. The method according to claim 3,
   wherein Si particles having a size in the range of about 0.2 $\mu$m to about 20 $\mu$m are suspended in the volatile liquid.

5. The method according to claim 1,
   wherein $SiO_2$ particles are suspended in the volatile liquid.

6. The method according to claim 5,
   wherein $SiO_2$ particles having a size in the range of about 0.2 $\mu$m to about 20 $\mu$m are suspended in the volatile liquid.

7. The method according to claim 1,
   wherein $Si_3N_4$ particles are suspended in the volatile liquid.

8. The method according to claim 7, wherein $Si_3N_4$ particles having a size in the range of about 0.2 $\mu$m to about 20 $\mu$m are suspended in the volatile liquid.

9. The method according to claim 1,
   wherein the volatile liquid comprises methanol.

10. The method according to claim 1, wherein the volatile liquid comprises ethanol.

11. The method according to claim 1, wherein the volatile liquid comprises acetone.

12. The method according to claim 1, wherein introducing into the spark plasma a volatile liquid in which particles are suspended creates an aerosol of the volatile liquid in which particles are suspended.

13. The method according to claim 1, wherein applying to the silicon sparks comprises applying a voltage between an electrode and the silicon.

14. The method according to claim 13, wherein introducing into the spark plasma a volatile liquid in which particles are suspended comprises introducing into the spark plasma a volatile liquid in which particles are suspended via a means for introducing into the spark plasma a volatile liquid in which particles are suspended which is in electrical contact with the electrode.

15. The method according to claim 13, wherein introducing into the spark plasma a volatile liquid in which particles are suspended comprises introducing into the spark plasma a volatile liquid in which particles are suspended via a means for introducing into the spark plasma a volatile liquid in which particles are suspended which is electrically isolated from the electrode.

16. The method according to claim 13, wherein a tip of the electrode is separated from the silicon by a distance between about 0.5 mm and about 10 mm.

17. The method according to claim 13, wherein a tip of the electrode is separated from the silicon by a distance between about 3 mm and about 4 mm.

18. The method according to claim 14, wherein the means for introducing into the spark plasma a volatile liquid in which particles are suspended comprises a metal needle, wherein the metal needle acts as the electrode.

19. The method according to claim 18, wherein the tip of the needle is modified such that an aerosol of the volatile liquid in which particles are suspended is introduced into the spark plasma.

20. A method for spark-processing silicon, comprising:

applying to the silicon sparks of sufficiently high voltage to effect the production of spark-processed silicon, wherein applying to the silicon sparks of sufficiently high voltage to effect the production of spark-processed silicon creates a spark plasma; and introducing into the spark plasma a volatile liquid in which a salt of a heavy ion is dissolved.

21. The method according to claim 20, wherein the salt of a heavy ion is a transition metal salt.

22. The method according to claim 21, wherein the transition metal salt is manganese chloride.

23. The method according to claim 20, wherein the salt of a heavy ion is rare earth ion salt.

24. The method according to claim 20, wherein the salt of a heavy ion is a lanthanide ion salt.

25. The method according to claim 24, wherein the lanthanide ion salt is selected from the group consisting of: cerium chloride, terbium chloride, and europium chloride.

26. The method according to claim 20, wherein introducing into the spark plasma a volatile liquid in which a salt of a heavy ion is dissolved during the production of the spark-processed silicon creates an aerosol of the volatile liquid in which a salt of a heavy ion is dissolved.

* * * * *